Patented June 26, 1945

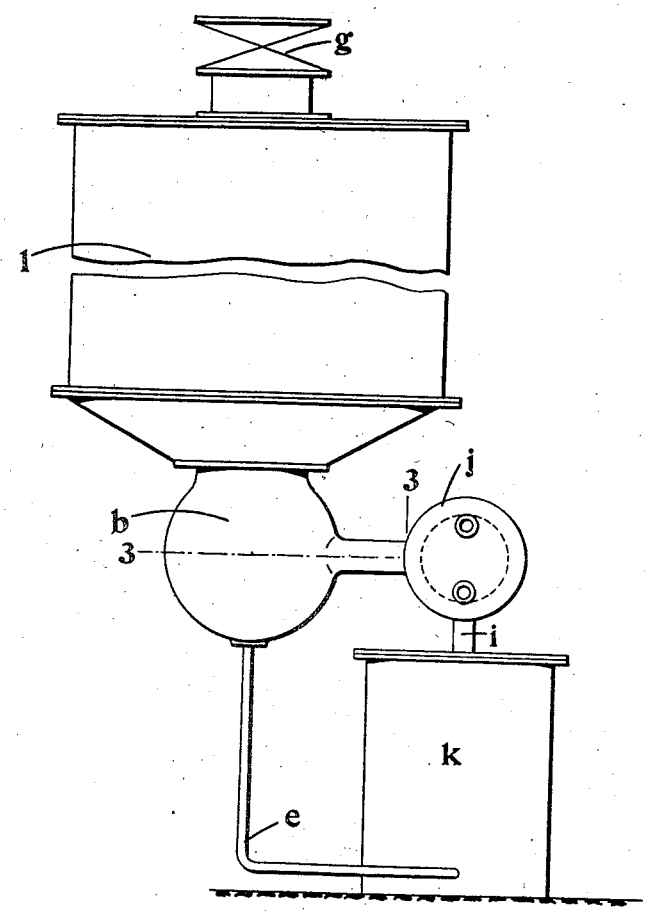
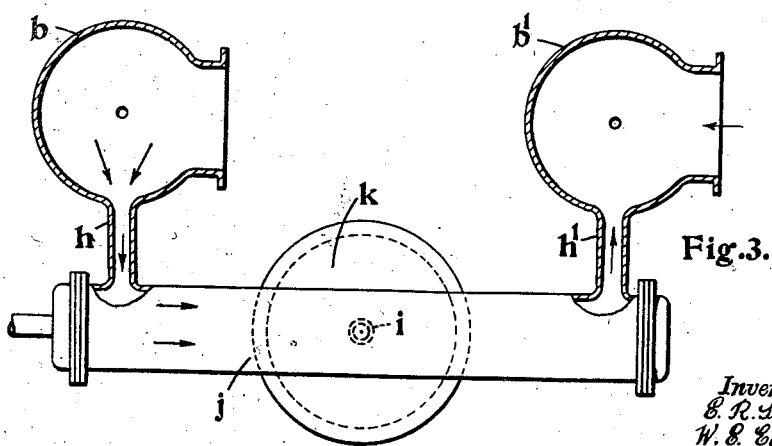

2,379,321

UNITED STATES PATENT OFFICE 2,379,321

ADSORPTION FILTER

Edgar Rouse Sutcliffe, Lowton, Newton-le-Willows, and William Ernest Edwards, Leigh, England, assignors to Sutcliffe, Speakman & Company Limited, Leigh, Lancashire, England, a company of Great Britain Application January 2, 1942, Serial No. 425,440
In Great Britain November 30, 1940

2 Claims. (Cl. 183—4.7)

This invention relates to adsorption filters employed for stripping vapour from solvent-laden air and for similar purposes.

The invention has among its objects to avoid loss of vapour in the operation of such filters, to increase the efficiency of operation and to avoid the use of independent vapour valves in such filters.

According to the invention in adsorption filter plant comprising a pair or a number of filters operating on alternate charging and flushing phases, air present in a filter during the flushing phases is entrained with the steam charged with solvent discharged from the filter and the mixture is subjected to cooling for the condensation and separation of the steam and solvent whereupon the air is passed into the stream of solvent-laden air admitted to a filter operating on the charging phase.

The invention further consists in an adsorption plant comprising a pair or a number of filters for solvent-laden air and a condenser or condensers connected to a pair or number of filters operating alternately on a charging phase and a flushing phase, the condenser or each condenser being connected to the filters with which it is intended to operate to permit communication between the steam and solvent discharge outlet of the one filter and the inlet for solvent-laden air of the second filter and being also connected for the discharge of the condensate.

According to the invention, moreover, the condensate from the condenser or from each condenser may be discharged into a corresponding separator into which also may drain any condensate from the filters with which the condenser co-operates.

According to the invention, also, the filters may be provided with admission chambers for the solvent-laden air of considerable surface area through which connection may be made with the corresponding condenser and with drain conduits leading to the corresponding separator where provided. The admission chambers of the respective filters may be provided as base fittings for the said filters. Thus in the use of a number or of pairs of filters operating in alternating phases the solvent-laden air may be admitted to one filter of a pair or number in the charging phase, while any air present in the filter being flushed will pass with the released vapour into the condenser and the separated air will pass from the condenser together with any remaining vapour suspended in it and pass with its remaining content of vapour into the stream of vapour laden air admitted to the filter to be charged, whereby no loss of vapour is thus possible by reason of incomplete separation of vapour from the remaining air passing out of the condenser.

Thus the invention is especially adapted to pairs of adsorption filters operating in alternating phases in which a common condenser is used.

The invention is diagrammatically illustrated by way of example in the accompanying drawings, in which Figure 1 is a sectional elevation of an adsorption filter plant according to the invention.

Figure 2 is a corresponding side elevation and

Figure 3 is a horizontal cross section on the line 3—3 of Figure 2.

Figure 1:
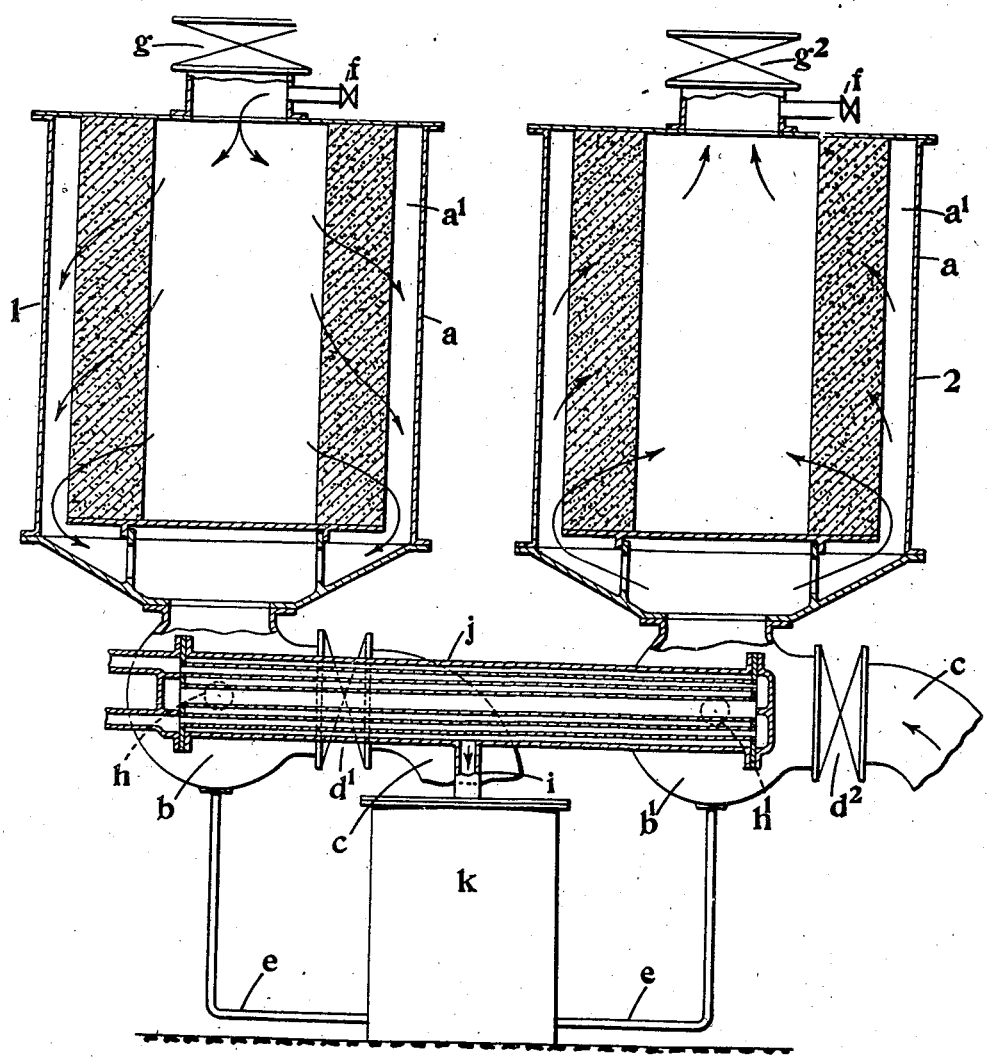

In carrying the invention into effect as illustrated in the accompanying diagrammatic drawings, adsorption filters 1 and 2 are employed in each of which an annular container $a$ for the active carbon in granular form, or other equivalent sorptive medium is packed. The filter 1 is shown as operating in the flushing phase and the filter 2 in the charging phase. The respective filters 1 and 2 are provided at a position beneath their casings with a substantially spherical spacious base fitting $b$. In the flushing phase (Figure 1), vapours previously adsorbed by the sorptive medium are flushed out of the filter with hot steam admitted through the steam admission pipe $f$, the outlet valve $g$ for the stripped air being closed. The hot steam, indicated by arrows, passes outwards through the sorptive medium in the annular container $a$ and thence into the surrounding annular space $a^1$, through the base fitting $b$ of the filter 1, and by way of a pipe $h$ into the condenser $j$. Pipes are mounted in the condenser $j$ through which cold water or other cooling medium circulates. The vapours and steam are thus condensed and the condensates pass through the outlet pipe $i$ of the condenser $j$ to a separator $k$, while any air that may be present in the filter 1 during the steaming operation is passed forward through the condenser and through the pipe $h^1$ into the base fitting $b^1$ of the filter 2. Each base fitting $b$, $b^1$ is provided with a drain pipe $e$ leading to the separator $k$.

It will be understood that during the flushing of the filter 1 with steam the filter 2 is being charged with vapour-laden air which passes into the filter 2 by way of the base fitting $b^1$ from the inlet pipe $c$ on the opening of the valve $d^2$ and the air with any vapour remaining in suspension that has entered the fitting $b^1$ by way of the condenser $j$, commingles with the vapour-laden air, being admitted through the pipe $c$, and passes with it upwardly through the annular space $a^1$ of the filter 2. The vapour-laden air then passes through the sorptive medium in the container $a$ into the central space in the container and the air stripped of vapour or solvent passes out to the atmosphere through the valve $g^2$ which is maintained open in the charging phase. The condenser $j$ is advantageously disposed in position beneath the filters 1 and 2 and in position beside the respective fittings $b$, $b^1$, and the space surrounding the condenser tubes communicates at the respective ends of the condenser casing with the fittings $b$, $b^1$.

It will be understood that the sequence of operations described in relation to the flushing of filter 1 and the charging of the filter 2 is precisely the same when the filter 2 is being flushed with steam and the filter 1 is being charged with solvent-laden air.

Where a number of adsorption filters is provided to operate in such manner that the filters alternate in the charging and flushing operations, a single common condenser may be provided as in the manner hereinbefore described to communicate with each of the filters, the connections being provided with control valves whereby the direction of flow between the condenser and any particular filter may be controlled to secure the desired sequence of operation of the several filters.

We claim:

1. An adsorption filter plant for the recovery of the solvent from solvent-laden air, comprising two adsorption filter casings, a bed of adsorbent material dividing each casing into first and second chambers, a hollow base fitting communicating with the second chamber of each casing, an inlet connection for solvent-laden air to each base fitting, a condenser extending between the base fittings, the said condenser having an outlet for condensate, a free flow connection between each base fitting and the corresponding end of the condenser, an outlet connection for solvent-free air from the first chamber of each casing, an inlet connection for flushing medium to the first chamber of each casing, and a valve for each of said inlet and outlet connections, whereby solvent-laden air flows through the bed into the first chamber of one casing while in the other casing flushing medium flows through the bed into the second chamber and thence through the condenser, uncondensed gases escaping from the condenser into the base fitting of the first-mentioned casing, the said valves being controlled so that each adsorption filter casing is alternately on charging and flushing phases.

2. An adsorption filter plant for the recovery of the solvent from solvent-laden air, comprising two adsorption filter casings, a bed of adsorbent material dividing each casing into first and second chambers, a fitting communicating with the second chamber of each casing, an inlet connection for solvent-laden air to each fitting, a condenser extending between the fittings, the said condenser having an outlet for condensate, a free flow connection between each fitting and the corresponding end of the condenser, an outlet connection for solvent-free air from the first chamber of each casing, an inlet connection for flushing medium to the first chamber of each casing, and a valve for each of said inlet and outlet connections, whereby solvent-laden air flows through the bed into the first chamber of one casing while in the other casing flushing medium flows through the bed into the second chamber and thence through the condenser, uncondensed gases escaping from the condenser into the fitting of the first-mentioned casing, the said valves being controlled so that each adsorption filter casing is alternately on charging and flushing phases.

EDGAR ROUSE SUTCLIFFE.
WILLIAM ERNEST EDWARDS.